United States Patent Office 2,960,378
Patented Nov. 15, 1960

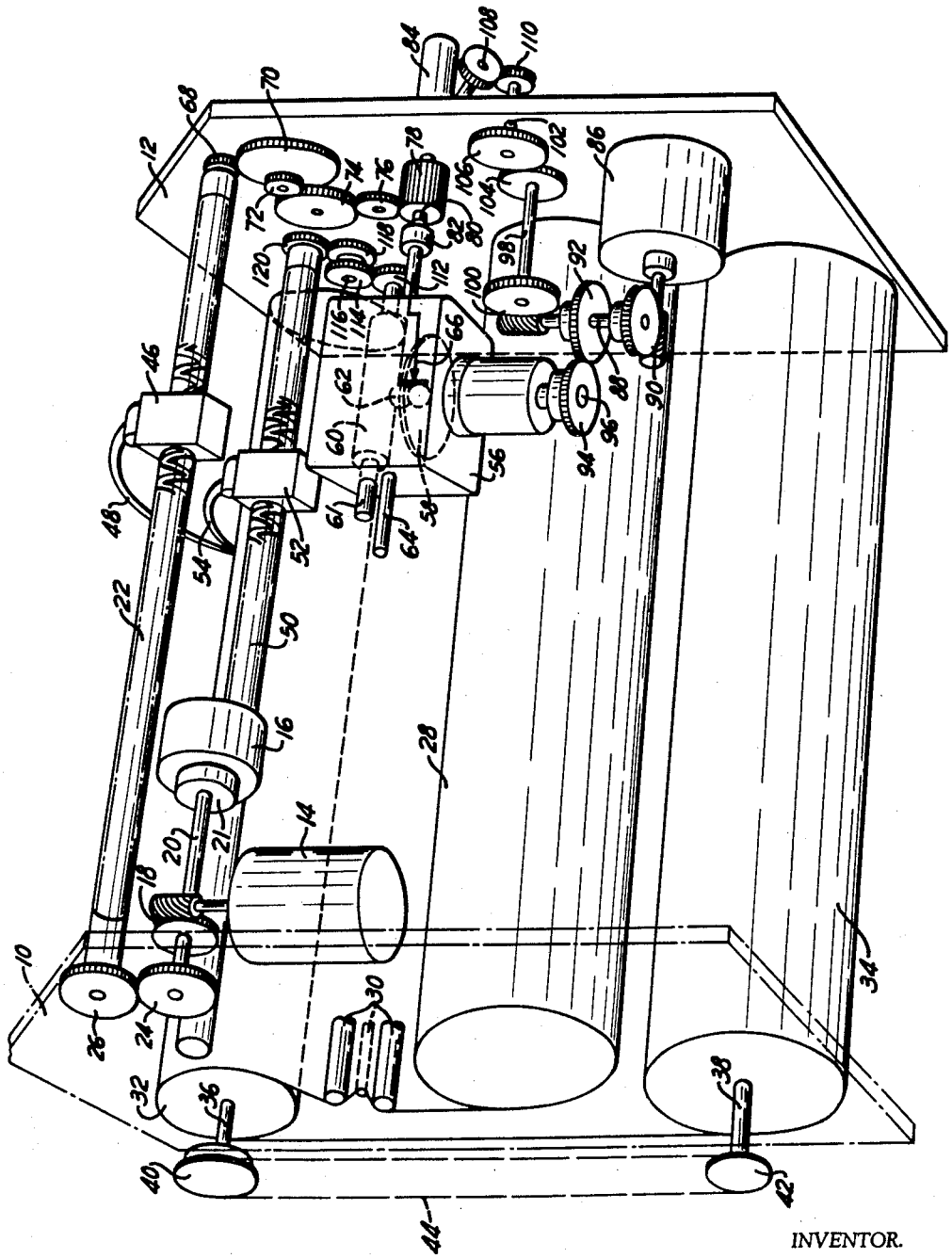

2,960,378

MAGNITUDE AND INTEGRAL RECORDER

Warren E. Wickerham, Penn Hills Township, Allegheny County, Pa., assignor to Gulf Research & Development Company, Pittsburgh, Pa., a corporation of Delaware Filed Dec. 19, 1958, Ser. No. 781,633

2 Claims. (Cl. 346—49)

The present invention relates to integrator-recorder combinations, and more particularly pertains to such a combination wherein an integral is recorded on a chart in a folded manner and wherein the value that is being integrated can also be recorded in a folded manner on the same chart.

Apparatus of the invention comprises a screw coupled to a self-balancing potentiometric system, such screw being provided with a follower that carries a stylus for recording on a moving chart, a conventional mechanical integrator including a disk, a cylinder and drive means drivingly connecting the disk and the cylinder, means for displacing the drive means by an amount proportional to the angular displacement of the screw coupled to the potentiometer, means for driving a chart, means for rotating the disk of the integrator, a reversing screw driven by the cylinder of the integrator, and a follower mounted on the reversing screw carrying a stylus for recording on the chart. In the preferred embodiment of apparatus according to the invention, the screw coupled to the potentiometer is also a reversing screw.

Apparatus according to the invention enables the recording of a variable magnitude such as a variable electrical signal with respect to time and also the concurrent recording of such magnitude integrated with respect to time upon a single chart. Notwithstanding the fact that the value of the variable magnitude integrated with respect to time can be an ever increasing function, the relationship of the integrator-driven reversing screw with its associated follower and stylus to the chart is such that the stylus will not pass off either side of the chart, but will reciprocate between limiting positions disposed within the confines prescribed by the width of the chart. This consideration also applies to the stylus associated with the screw coupled to the potentiometric system when such screw is the reversing type according to the preferred embodiment of the invention.

Recording an ever increasing function in such a manner that the stylus reciprocates within the lateral confines of the chart can be considered as recording upon a folded scale. Recording upon a folded scale does not impose any arbitrary upper or lower limit to the values that can be recorded, and where a reversing screw is used in recording the variable magnitude fed to the potentiometric system, the only limit imposed on the magnitude to be recorded is that which is inherent in the range of the potentiometric system used.

Aside from the advantages of folded scale recordation suggested above, it is particularly advantageous in the use of the preferred embodiment of the invention for the reason that inspection of the dual recordings will readily reveal points of actual scale folding and serve to distinguish such points from those of superficial resemblance, such as can occur at maximal and minimal points. This will be apparent upon considering the mathematical relationship existing between the slope of one curve (the integral) and the value represented by the other curve.

The invention will be best appreciated upon reference to the single drawing which is a schematic rear view illustration of a preferred embodiment thereof, wherein the potentiometric system is such as to be responsive to the variable magnitude of an electrical signal. Such electrical potentiometric system can be also considered representative of conventional mechanical and hydraulic potentiometric systems. Referring to the drawing, the numerals 10 and 12 designate side walls which provide support for and through which are journaled various elements of the apparatus subsequently to be described. An electrical self-balancing potentiometric system is provided which comprises a servo motor 14 and a potentiometer 16, the servo motor 14 being drivingly connected to the potentiometer 16 by worm gearing 18, a shaft 20, and reduction gear box 21. It will be understood, as is conventional, that the potentiometer 16 is adapted to receive an electrical signal, the magnitude of which represents a value to be recorded, and that the servo motor 14 is driven in a forward or reverse direction, as the case may be, to balance the circuits of the potentiometer 16. The shaft 20 which is journaled through the wall 10 is therefore angularly displaced by an amount that is linear with respect to the magnitude of the electrical signal fed to the potentiometer 16.

A reversing screw 22 is journaled at its opposite ends through the side walls 10 and 12, and is arranged to be driven by means of meshing spur gears 24 and 26 fixed to the adjacent ends of the shaft 20 and the reversing screw 22. The reversing screw 22 is therefore driven by the self-balancing potentiometric system comprised of the servo motor 14 and the potentiometer 16, with the angular displacement of the reversing screw 22 being linear with respect to the magnitude of the electrical signal fed to the potentiometer 16.

Chart paper from a supply roll 28 is fed through tension rollers 30 and over a drum 32, and thence to a take-up roll 34. The drum 32 is mounted on a shaft 36 having its opposite ends journaled through the walls 10 and 12, while the take-up roll 34 is mounted on a shaft 38 that has its opposite ends journaled through the walls 10 and 12. Pulleys 40 and 42 are fixed to the ends of the shafts 36 and 38 projecting through the wall 10, and over such pulleys 40 and 42 is loosely entrained a belt 44 whereby the roll 34 is caused to rotate with sufficient force during rotation of the drum 32 as to maintain tension in that portion of the chart paper passing over the drum 32, but insufficient to cause slippage between the chart paper and the drum 32. The tension rollers 30 are only partially shown, as their structure and function are well known in the art. The tension rollers 30 can, if desired, be journaled in the walls 10 and 12, or they can be mounted in any conventional manner.

A follower 46 is mounted on the reversing screw 22 for actuation thereby, and the follower 46 carries a stylus 48 that contacts chart paper on the drum 32 so as to provide a recording trace on the chart paper during rotation of the drum 32.

The follower 46 is conventional in its cooperation with the reversing screw 22 in that for a constant velocity of rotation of the reversing screw 22, the follower 46 will travel at a constant velocity along the reversing screw 22 until it reaches one end thereof, whereupon it will reverse its direction of movement but maintain an otherwise equal velocity. Such reversal of travel, of course, occurs at each end of the threaded portion of the reversing screw 22. Such construction is common in fishing reels incorporating what is known as a level-winding feature wherein the line guide reciprocates on a reversing screw in a manner such as that described for the follower 46. The threaded length of the reversing screw 22 is such that the stylus 48 is never caused to pass beyond the lateral boundaries of the chart paper.

Though preferred and so illustrated, it is not essential that the screw 22 be a reversing screw when the variations in the magnitude of the signal fed to the potentiometer 16 are such that the stylus 48 will not pass beyond the lateral edges of the chart paper.

A second reversing screw 50 is provided which has its opposite ends journaled through the walls 10 and 12. A follower 52, corresponding to the follower 46, is mounted on the reversing screw 50, with the follower 52 being provided with a stylus 54 that engages chart paper passing over the drum 32. The reversing screws 22 and 50 are parallel to the shaft 36 of the drum 32, and the stylus 54 is dimensioned so that its recording tip passes closely to the recording tip of stylus 48 without actual contact during movements of the followers 46 and 52. Though not shown, it will be understood that if deemed necessary or desirable, the followers 46 and 52 can be provided with guide means for preventing their rotation, though this can be most conveniently effected by simply weighting each of the followers so that the stylus carried thereby is urged into contact with the chart paper on the drum 32.

Means for driving the reversing screw 50 will now be described. A conventional mechanical integrator 56 is securely mounted in any suitable manner, such integrator 56 including a disk 58 and a cylinder 60 mounted on a shaft 61. The integrator 56 also includes a translatable drive means drivingly connecting the disk 58 to the cylinder 60. The driving ratio between the disk 58 and the cylinder 60 is determined by the position of the drive means, which means can be the conventional ball means 62 illustrated or, as will be appreciated by those skilled in the art, equivalents thereof such as the ring means of the "American Ring Integrator" shown in Product Data Sheet No. 104–1 of the American Meter Company, Inc. The integrator 56 includes conventional means for translating the ball means 62 along a path coincident with the center of the disk 58 and parallel to the axis of the cylinder 60, whereby the driving ratio between the disk 58 and the cylinder 60 can be varied. Such means for translating the ball means 62 is conventional and includes a reciprocable shaft 64 that is operatively coupled to the ball means 62 by an arrangement diagrammatically illustrated by the arrow shown at 66.

The ball means 62 is displaced by an amount linear with respect to the angular displacement of the reversing screw 22 by structure that includes a gear 68 fixed to the reversing screw 22 adjacent to the side wall 12 that meshes with a drive gear 70 fixed on a shaft journaled in the wall 12. Fixed to the gear 70 is a smaller gear 72 that meshes with another drive gear 74 carried by a shaft journaled in the wall 12. The gear 74 is in turn meshed with an idler gear 76 also fixed on a shaft journaled in the wall 12, with the gear 76 being in meshing engagement with an elongated gear 78 that is fixed to a shaft 80 that rotatably and reciprocably extends through the wall 12.

The shaft 80 is connected to the shaft 64 of the integrator 56 by a conventional spring loaded collar 82 that retains such shafts in abutting relation while allowing the shaft 80 to rotate independently of the shaft 64.

The end of the shaft 80 projecting from the wall 12 opposite the gear 78 is externally threaded and is threadingly received within an internally threaded sleeve 84 fixed to the wall 12. The arrangement is such that the shaft 80 is driven by the reversing screw 22, with the shafts 80 and 64 being axially translated to an extent that is linear with respect to the angular displacement of the shaft 80 due to the interaction between the threaded portion of the shaft 80 and the internally threaded sleeve 84. It will be noted that the length of the gear 78 affords meshing engagement between the gears 76 and 78 throughout a substantial axial displacement of the shaft 80. Furthermore, the connection of the shafts 64 and 80 assures axial translation of the shaft 64 along with axial translation of the shaft 80. It will therefore be seen that the ball means 62 is displaced in an amount linear with respect to the angular displacement of the reversing screw 22.

Means employing a single prime mover such as a constant speed electric motor 86 secured to the wall 12 is provided for driving the disk 58 of the integrator 56 and the drum 32 at proportional angular velocities. Such construction takes the form of the motor 56 driving a shaft 88 at a constant velocity by worm gearing 90, such shaft 88 being mounted for rotation by any suitable means, not shown. The disk 58 is driven by meshing spur gears 92 and 94 fixed to the shaft 88 and the spindle 96 of the disk 58, respectively.

A shaft 98 journaled in the wall 12 for rotation is driven from the shaft 88 by worm gearing 100, with the shaft 98 driving a shaft 102 journaled through the wall 12 by means of meshing spur gears 104 and 106 fixed to the shafts 98 and 102, respectively. The shaft 102 drives the shaft 108 by means of meshing helical gears 110, with the shaft 108 being arranged to drive the shaft 36 and so rotate the drum 32 by helical gears, not shown, fixed to the shaft 108 and the end of the shaft 36 projecting through the wall 12, as will be understood.

The cylinder 60 of the integrator 56 is drivingly connected to the reversing screw 50 by means comprising a gear 112 fixed to the shaft 61 that meshes with a gear 114 fixed on a shaft 116 journaled for rotation in the wall 12. A gear 118 is fixed on the shaft 116 which meshes with a gear 120 fixed on the reversing screw 50 so as to rotate the latter.

The operation of the illustrated and described apparatus will be readily understood. The electric motor 86 drives the chart paper over the drum 32 at a constant speed of advance in contact with the stylus 48 and the stylus 54 so that a record versus time is produced of the positions of the followers 46 and 52 along the axis of their respective reversing screws 22 and 50. The self-balancing potentiometric system comprised of the servo motor 14 and the potentiometer 16 serves to drive the reversing screw 22 in such a fashion that the angular displacement of the reversing screw 22 is linear with respect to the magnitude of the electrical signal fed to the potentiometer 16. With such a relationship, the follower 46 will occupy a position on the reversing screw 22 determined by the magnitude of the signal fed to the potentiometer 16, and the apparatus is preferably initially adjusted so that for a zero magnitude of the electrical signal, the follower 46 is placed at or adjacent the right end of its travel on the reversing screw 22 (as seen in the drawing), with the thread tracking element, not shown, thereof disposed with respect to the threads of the reversing screw 22 so that an increase in the magnitude of the electrical signal will drive the follower 46 to the left.

Though the adjustment can be such that the ball means 62 is centered with respect to the disk 58 when the magnitude of the electrical signal has any selected value, it is preferred that the apparatus is initially adjusted so that the ball means 62 is centered with respect to the disk 58 when the reversing screw 22 occupies such angular position corresponding to a zero magnitude for the electrical signal fed to the potentiometer 16. The driving ratio between the reversing screw 22 and the reciprocating shaft 64 is such with respect to anticipated maximum and minimum magnitudes of the electrical signal that the ball means 62 is never displaced to a position outside the radius of the disk 58. Since the reversing screw for the stylus 48 assures that the travel of the stylus 48 will never exceed the width of the chart paper, it will be appreciated that the gear ratio between the shaft 20 and the reversing screw 22 can be made large so that recording deflections can be obtained for relatively minor variations in the magnitude of the electrical signal fed to the potentiometer 16. Proper displacement of the ball means 62 with respect to the disk 58 can be attained by selecting gearing to reduce adequately the driving ratio between the reversing screw 22 and the gear 78 and/or the selection of an adequately fine thread for the connection between the shaft 80 and the sleeve 84.

Exemplary of suitable apparatus components where the potentiometer 16 employed requires 10 revolutions to balance a 25 millivolt change in the magnitude of the signal being recorded and where the driving ratio between the servo motor 14 and the shaft 20 is 60 to 1, a gear reduction of 2.5 to 1 to the potentiometer 16 by means of gear box 21, the driving ratio between the shaft 20 and the reversing screw 22 can be 1 to 1 and the driving ratio between the reversing screw 22 and the gear 78 can be 8 to 1, with the threaded connection between the shaft 80 and the sleeve 84 employing 40 threads per inch. The reversing screw 22 in this arrangement can have 5 threads per inch, and an effective reversing length of 10 inches. The drum 32 is of sufficient length to accommodate chart paper of more than 10 inch width, and has a circumference of 6 inches. The driving ratio between the electric motor 86 and the shaft 36 is such as to rotate the drum 32 at 0.055 r.p.m. The driving ratio between the electric motor 86 and the spindle 96 of the disk 58 is such as to give the disk a rotation of 33⅓ r.p.m. The driving ratio between the cylinder 60 and the reversing screw 50 can be 5 to 1, while the latter can employ 5 threads per inch and be 10 inches in effective reversing length.

With the described drive for the disk 58 and the described manner in which the ball means 62 is displaced in relation to the angular position of the reversing screw 22, the cylinder 60 is angularly displaced by an amount corresponding to the integrated value of the magnitude of the signal fed to the potentiometer 16 with respect to time, with the reversing screw being displaced angularly by an amount proportional to the angular displacement of the cylinder 60. Hence, the follower 52 and the stylus 54 carried thereby are caused to occupy a position determined by the magnitude of the electrical signal integrated with respect to time.

The outstanding advantages of the illustrated and described preferred embodiment of the invention are that the folded scale mode of recording both the magnitude of the electrical signal and the same integrated with respect to time makes possible relatively large chart deflections for small changes in each of the values being recorded, virtually without regard to the width of the chart paper used. Also, since in a mathematical sense, the curve produced by the stylus 48 is the derivative of the curve produced by the stylus 54, there is no possibility of confusion in interpreting the values represented by such curves despite their folded nature. For example, confusion might occur in interpreting one of such curves taken by itself where such curve closely approaches and then retreats from a position corresponding to a lateral limiting position of its corresponding stylus, as it might not be certain whether the curve should be considered as representing progressively increasing or progressively decreasing values through such point or whether the curve should be interpreted as a progressive increase in such values followed by a progressive decrease in such values, or vice versa. Such confusion in interpretation is avoided upon reference to the other curve, bearing in mind the mathematical relationship existing between the character of the curves.

The detail of the foregoing description has been for the purpose of conveying a full and complete understanding of the principles of the invention, and should not be interpreted as implying any narrowness in scope of the actual invention, attention being directed to the appended claims for ascertainment of the actual scope of the invention.

I claim:

1. Apparatus for recording a variable magnitude with respect to time and also concurrently recording such magnitude integrated with respect to time, comprising a self-balancing potentiometric system and a screw coupled thereto, a reversing screw parallel to said screw, a follower mounted on each of said screws, a stylus carried by each of the followers for recording on a moving chart, means for driving a chart at a constant velocity, means for driving the reversing screw comprising a mechanical integrating device that includes a rotatable disk, a cylinder rotatable about an axis normal to the axis of rotation of the disk and drive means disposed between the disk and the cylinder establishing a driving connection therebetween, means for rotating the disk at a constant velocity, means for displacing the drive means along a path parallel to the cylinder by an amount proportional to the angular displacement of the screw, and means for drivingly connecting the cylinder to the reversing screw.

2. Apparatus for recording a variable magnitude with respect to time and also concurrently recording such magnitude integrated with respect to time, comprising a self-balancing potentiometric system and a first reversing screw coupled thereto, a second reversing screw parallel to the first reversing screw, a follower mounted on each of said reversing screws, a stylus carried by each of the followers for recording on a single moving chart, means for driving a chart at a constant velocity, means for driving the second reversing screw comprising a mechanical integrating device that includes a rotatable disk, a cylinder rotatable about an axis normal to the axis of rotation of the disk and drive means disposed between the disk and the cylinder establishing a driving connection therebetween, means for rotating the disk at a constant velocity, means for displacing the drive means along a path parallel to the cylinder by an amount proportional to the angular displacement of the first reversing screw, and means for drivingly connecting the cylinder to the second reversing screw.

References Cited in the file of this patent

UNITED STATES PATENTS

| | | |
|---|---|---|
| 2,108,037 | Au | Feb. 15, 1938 |
| 2,716,340 | Nance et al. | Aug. 30, 1955 |
| 2,834,247 | Pickels | May 13, 1958 |